US012254472B2

(12) United States Patent
Hammock et al.

(10) Patent No.: US 12,254,472 B2
(45) Date of Patent: Mar. 18, 2025

(54) ENERGY-TO-TOKEN REDISTRIBUTION SYSTEMS AND METHODS FOR WIRELESS NETWORK ACCESS AND LOCALIZED BLOCKCHAIN DISTRIBUTED COMPUTING

(71) Applicant: SafeMoon US, LLC, Pleasant Grove, PA (US)

(72) Inventors: Cory Jacob Hammock, White City, OR (US); Braden John Karony, Lindon, UT (US); Robert Spraggs, Coldstream (CA)

(73) Assignee: SafeMoon US, LLC, Pleasant Grove, UT (US)

( * ) Notice: Subject to any disclaimer, the term of this patent is extended or adjusted under 35 U.S.C. 154(b) by 0 days.

(21) Appl. No.: 18/205,683

(22) Filed: Jun. 5, 2023

(65) Prior Publication Data

US 2023/0401577 A1 Dec. 14, 2023

Related U.S. Application Data

(63) Continuation of application No. 18/202,900, filed on May 27, 2023, now abandoned.

(60) Provisional application No. 63/346,925, filed on May 30, 2022.

(51) Int. Cl.
*G06Q 20/40* (2012.01)
*G06Q 20/38* (2012.01)
*G06Q 50/06* (2012.01)

(52) U.S. Cl.
CPC ......... *G06Q 20/401* (2013.01); *G06Q 20/389* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 11,900,488 B2* | 2/2024 | Rechtiene | ................. H02J 3/38 |
| 2008/0130895 A1 | 6/2008 | Jueneman et al. | |
| 2009/0234750 A1* | 9/2009 | Arfin | ................. G06Q 30/0623 |
| | | | 705/26.1 |
| 2011/0130982 A1 | 6/2011 | Haag et al. | |
| 2014/0304068 A1 | 10/2014 | Weinblatt et al. | |
| 2017/0358041 A1* | 12/2017 | Forbes, Jr. | ............... G05D 3/12 |
| 2019/0052467 A1 | 2/2019 | Bettger | |
| 2019/0087920 A1* | 3/2019 | Cui | ................. G06Q 20/3829 |
| 2020/0019517 A1* | 1/2020 | Chazot | ................. G06F 3/167 |
| 2021/0090185 A1 | 3/2021 | Forbes et al. | |
| 2021/0105139 A1 | 4/2021 | Choi et al. | |

(Continued)

FOREIGN PATENT DOCUMENTS

| | | | | |
|---|---|---|---|---|
| CN | 115134084 A | | 9/2022 | |
| KR | 20180114182 A | | 10/2018 | |
| WO | WO-2022204404 A1 * | | 9/2022 | ............. G06F 21/10 |

OTHER PUBLICATIONS

International Search Report and Written Opinion from related international application PCT/US23/23783, issued Aug. 29, 2023.

*Primary Examiner* — Paul S Schwarzenberg
(74) *Attorney, Agent, or Firm* — William Gray Mitchell

(57) ABSTRACT

An energy-to-token system and method of use for off-grid enabled token operations to enable remote blockchain network computations, wireless and mesh networking access, renewable energy credit trading via stablecoin transactions, and Web 3.0 processing logic and functional interconnectivity with global Web 2.0 services.

10 Claims, 2 Drawing Sheets

(56) References Cited

U.S. PATENT DOCUMENTS

| | | |
|---|---|---|
| 2021/0266150 A1 | 8/2021 | Ornelas et al. |
| 2021/0035714 A1 | 11/2021 | Silvestri |
| 2022/0029464 A1 | 1/2022 | Smith et al. |
| 2022/0166638 A1 | 5/2022 | Razi et al. |
| 2022/0245574 A1* | 8/2022 | Cella .................... G06Q 10/087 |
| 2022/0366494 A1* | 11/2022 | Cella ........................ H04L 9/50 |

* cited by examiner

ENERGY-TO-TOKEN REDISTRIBUTION SYSTEMS AND METHODS FOR WIRELESS NETWORK ACCESS AND LOCALIZED BLOCKCHAIN DISTRIBUTED COMPUTING

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a system and method for the utilization of renewable generated power to mine, mint, burn, or stake cryptocurrency tokens; and, in the same system, to allocate renewable energy credits (REC) to be traded for non-fungible tokens (NFT) (REC-to-NFT transactions) while enabling wireless network operations for off-grid environments. The system enables off-grid Web 3.0 decentralized computing to provide wireless and internet-of-things (IoT) mesh networking access to areas with minimal power generation availability. Users providing Wi-Fi enabled devices can connect to the system via long-range electromagnetic radiation fields and, upon connecting requisite devices will be prompted to create a SafeMoon wallet (token account). Upon user registration and account validation, Wi-Fi services will be fully enabled to interact with Web 3.0-enabled decentralized services with Web 2.0 functionality (general Internet services) offered through local Internet Service Provider equipment.

Background of the Invention

Renewable energy generation has rarely been utilized for the purpose of mining, minting, burning, or staking cryptocurrency tokens. With high cost of renewable energy generation devices, coupled with ease-of-use token providers with high volume surplus for mining, minting, burning, or staking operations, a system equipped with continuous renewable energy generators would allocate power to token operations, allocate power for renewable energy credit (REC) transmission or storage for purchase, and allocate power for off-grid wireless network operations.

This fully integrated system generates the following services: non-fungible token (NFT) transactions via RECs, tokens, or fiat currency; off-grid smart contract computations for user accounts connected via the provided wireless network; off-grid omni-token mining, minting, staking, and/or burning functions; wireless and mesh networking connectivity for off-grid and long-range Wi-Fi 802.11 standard broadcast routers; Web 3.0 decentralized application computing operations and bridge to Web 2.0 (Global Internet) connection.

With excess power generation utilized for REC services, transactable RECs can be converted to stablecoin tokens for wider transaction availability. RECs generated from the system may be transacted/sold under commonly used tax-incentivized vehicles, such as power-purchase agreements (PPA) and REC-arbitrage. A novelty of integrated token distribution computations from local blockchain processing involves REC-to-stablecoin network trading for open-market transactions. In one example, 1 megawatt-hour (MWh) of excess energy generated equals 1×MWh of a REC, valued at local electricity market rates. Within tradeable RECs of open-market credit purchase agreements, the 1 MWh REC may be transacted by a purchaser with stablecoins or internally purchased with equivalent stablecoin value, to promote the available access of produced renewable energy.

Connected accounts to the token-redistribution system will be incorporated into a locally cached database and processing server(s) and integrated into SafeMoon native blockchain operations. All Web 3.0 decentralized transactions with token exchanges, NFT marketplaces, and omni-chain operations are stored and cached into the local digital ledger architecture, which is then transmitted to the native global decentralized ledger architecture.

BRIEF DESCRIPTION OF THE INVENTION

In a preferred embodiment, an energy-to-token redistribution system comprising: one or more power-generating devices or systems, a blockchain system comprising one or more energy storage systems, at least one processor storing a redundant ledger, at least one blockchain integrated smart contract, one or more transceivers, and optionally, a Web 2.0 internet connection proxy and a Web 2.0 gateway, wherein all or some of the power generated by the power-generating devices is transmitted by a power transmission line to and stored in the one or more energy storage systems, such power is then transmitted by power transmission line to a power substation or similar facility for power resale and the one or more transceivers are connected to one or more wireless transceiver endpoints, and wherein all power delivery and sale transaction data are stored in the redundant ledger.

In another preferred embodiment, the energy-to-token redistribution system described herein, wherein such system is used to effect one or more of: non-fungible token (NFT) transactions via renewable energy credits (RECs), tokens, or fiat currency; off-grid smart contract computations for user accounts connected via a provided wireless network; optional off-grid omni-token mining, minting, staking, and/or burning functions; wireless and mesh networking connectivity for off-grid and long-range Wi-Fi 802.11 standard broadcast routers and Web 3.0 decentralized application computing operations and bridge to Web 2.0 (Global Internet) connection.

In another preferred embodiment, the energy-to-token redistribution system described herein, wherein the at least one processor stores all transaction data, local to the system deployment in redundant ledger, such ledger embodied as one or more local chain ledgers, such transaction data to include power generation supply, renewable energy credit generation and transactions, local-NFT transactions, wireless NFT-identification (ID) account interoperations, and any local token transaction operations.

In another preferred embodiment, the energy-to-token redistribution system described herein, wherein the one or more processors house a locally cached and processing blockchain, as well as conduct mining, minting, staking, or burning operations to expand local liquidity volume, wherein, upon reaching predesignated monetary thresholds, a local liquidity value may either be transacted for stablecoin, native network and blockchain ecosystem processing coins (Bitcoin, Ethereum, exchange coins, etc.) or for custom integrated tokens via the Web 2.0 Internet connection proxy.

In another preferred embodiment, the energy-to-token redistribution system described herein, wherein one or more algorithms stored on the one or more processors (1) monitor the charge of the one or more energy storage systems, (2) upon the charge reaching a preset level, or on a timed basis, prompts the energy storage system(s) to transmit power to the power substation or similar facility and records the amount of such power transmission, (3) monitor preestablished financial accounts and record payments for the power sold, (4) tags recorded power generation and sale data as REC-eligible and records a related REC valuation in the redundant ledger.

In another preferred embodiment, the energy-to-token redistribution system described herein, wherein REC valuations from power generation and sales are bundled into transactable RECs and then converted to NFTs at a predesignated monetary valuation and recorded in the redundant ledger, such NFTs thereby becoming available for open-market purchase through the blockchain system, with the blockchain system effecting purchase agreements wherein a purchaser may buy one or more such NFTs for stablecoins, network processing coins, or custom integrated tokens of equivalent value.

In another preferred embodiment, the energy-to-token redistribution system described herein, wherein the purchase of RECs enabled by the blockchain system are effected through available tax-incentivized vehicles, included but not limited to power-purchase agreements (PPA) and REC-arbitrage.

In another preferred embodiment, the energy-to-token redistribution system described herein, wherein the one or more processors comprise graphic processing units (GPU) and/or application-specific integrated circuit (ASIC) equipment to innervate power supply operations from the energy storage systems.

In another preferred embodiment, the energy-to-token redistribution system described herein, wherein the one or more power generators comprise wind-turbines, solar harnessing devices and/or other known green energy power sources.

In a related embodiment, a method of using the energy-to-token redistribution system as described herein, comprising the steps:

1. generating excess energy with one or more power generators,
2. transmitting power from the one or more power generators and storing such power in an energy storage system;
3. tagging generated energy as RECs via chain enabled smart-contracts,
4. converting the RECs to NFTs, thus making them available for purchase on the open market, which may then be transactable through local power substations, energy storage transfer systems, centralized exchanges, decentralized exchange environments, or alternative buying power controls regulated by compliance offices,
5. periodically transmitting stored power from the energy storage system to a power substation or similar facility as a sale transaction, executed via off and on-chain smart contracts;
6. automating the REC transaction process with the one or more processors through the Web 2.0 Internet connection proxy,
7. depositing the capital generated from each power sale and REC transaction into off-system accounts, and
8. consistently capturing all related transaction data including power generation amounts, power storage amounts, power sale amounts, monies collected, REC valuations and sale transaction data, in the installed redundant ledger and thereby onto both the local processing chain and Web 3.0 global network chain.

DETAILED DESCRIPTION OF THE INVENTION

Figure 1:
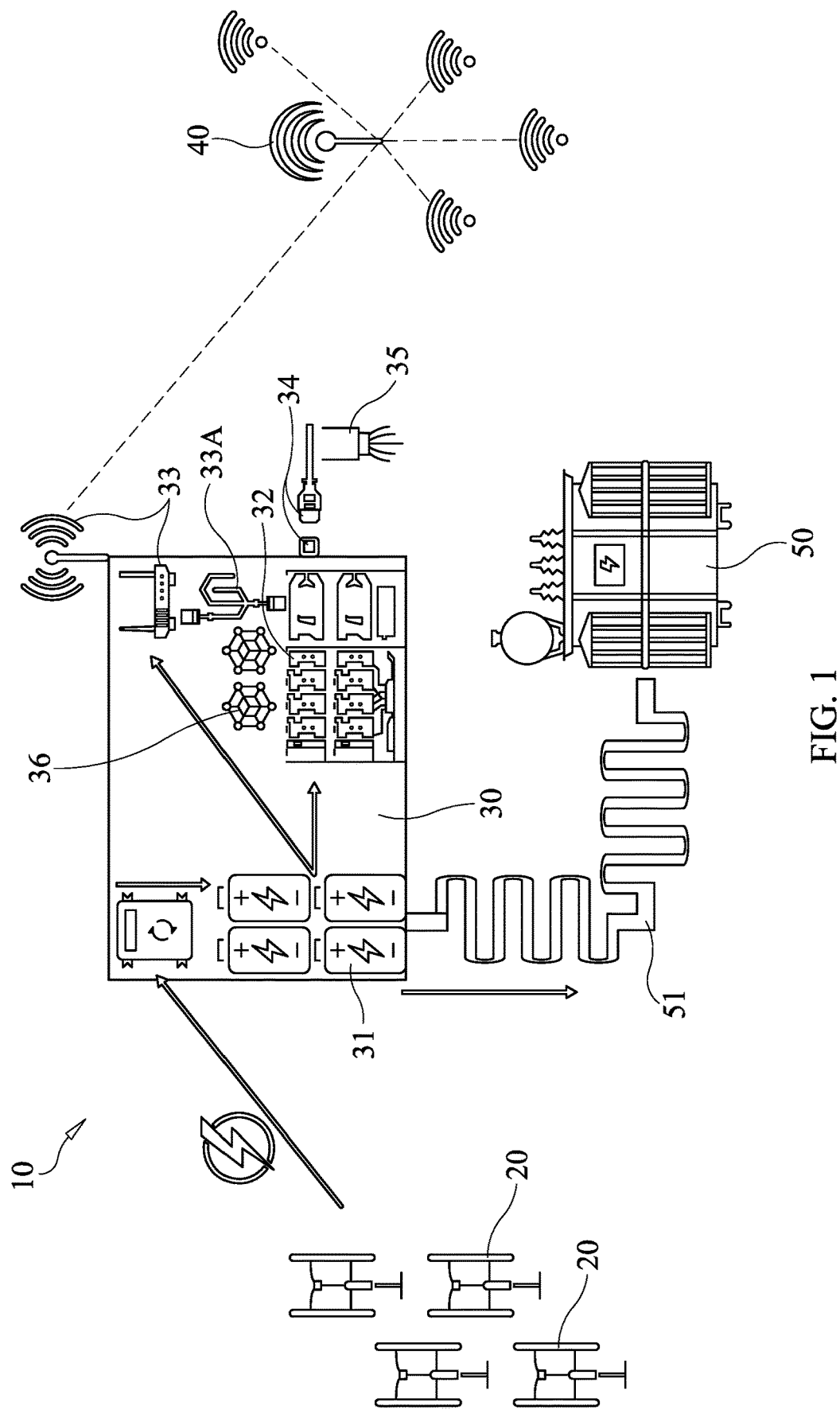
FIG. 1 is a schematic drawing evidencing the inventive energy-to-token redistribution system.

Renewable energy generation may originate from multiple power generation systems. In a preferred embodiment, wind-turbine and solar harnessing devices are the preferred methods of generating power from natural resources. To deliver off-grid wireless networking functionality, modular system architecture such as solar panels, wind turbines is paramount for distribution, maintenance, and ease-of-implementation.

Generated power is transmitted to and through available controllers to invert the power into usable and stable voltages, then being delivered to energy storage devices contained within the modular housing system. Energy storage devices may exist in the form of lithium-ion, lithium-phosphate, vanadium redox, and/or hydrogen battery cells. In a preferred embodiment, the system is self-powered by the system's own power generators and energy storage system.

This fully integrated system generates the following services: non-fungible token (NFT) transactions via RECs, tokens, or fiat currency; off-grid smart contract computations for user accounts connected via the provided wireless network; off-grid omni-token mining, minting, staking, and/or burning functions; wireless and mesh networking connectivity for off-grid and long-range Wi-Fi 802.11 standard broadcast routers; Web 3.0 decentralized application computing operations and bridge to Web 2.0 (Global Internet) connection.

With excess power generation utilized for REC services, transactable RECs can be converted to stablecoin tokens for wider transaction availability. RECs generated from the system may be transacted/sold under commonly used tax-incentivized vehicles, such as power-purchase agreements (PPA) and REC-arbitrage. A novelty of integrated token distribution computations from local blockchain processing involves REC-to-stablecoin network trading for open-market transactions. In one example, 1 megawatt-hour (MWh) of excess energy generated equals 1×MWh of a REC, valued at local electricity market rates. Within tradeable RECs of open-market credit purchase agreements, the 1 MWh REC may be transacted by a purchaser with stablecoins or internally purchased with equivalent stablecoin value, to promote the available access of produced renewable energy.

Connected accounts to the token-redistribution system will be incorporated into a locally cached database and processing server(s) and integrated into SafeMoon native blockchain operations. All Web 3.0 decentralized transactions with token exchanges, NFT marketplaces, and omni-chain operations are stored and cached into the local digital ledger architecture, which is then transmitted to the native global decentralized ledger architecture.

Within the modular system, arrays of computational processing devices—mainly consisting of graphic processing units (GPU) and/or application-specific integrated circuit (ASIC) equipment—innervate power supply operations from the energy storage systems. For example, in one embodiment the processors monitor the charge contained in the energy storage systems and, at a certain preset level, trigger the energy storage systems to deliver a preset number of MWh to the power substation, then remotely verify receipt of payment for each delivery and related REC generation/receipts. Within the onboarded servers/GPUs, locally cached and encrypted software of the primary blockchain is installed and replicated for high-availability operations. All transactable data, local to the system deployment, will be stored in the local chain ledger(s)—to include power generation supply, renewable energy credit generation and transactions, local-NFT transactions, wireless NFT-identification (ID) account interoperations, and local token transaction operations.

The onboarded GPU servers or other processors house the locally cached and processing blockchain, as well as conduct mining, minting, staking, or burning operations to expand local liquidity volume. Upon reaching predesignated monetary thresholds, the local liquidity value may be either transacted for stablecoin, such as USDT, USDC, or BUSD tokens, native network and blockchain ecosystem processing coins, such as Bitcoin, Ethereum, exchange coins, etc., or for SafeMoon created or other custom integrated tokens via the Web 2.0 Internet connection proxy.

Excess energy generated from the system is continuously monitored and stored via the installed redundant ledger. This energy is tagged as REC eligible via chain-enabled smart contracts and made available for purchase on the open market, which may then be transactable through local power substations, energy storage transfer systems, centralized exchanges, decentralized exchange environments or alternative buying power controls regulated by compliance offices. The onboarded computational devices automate the REC transaction process through the Web 2.0 Internet connection proxy. The capital generated from the purchase is deposited into off-system accounts that are connected to and monitored by the system via the internet, allowing the ledger to capture the entire transaction data onto the local processing chain.

Wireless network operations may traverse long-range Wi-Fi extended networks to create a centralized routing topology to community areas and/or allow each connected device to route wireless traffic for optimal Web 3.0 (tokenomic/smart-contract) or Web 2.0 (802.11 standard) bandwidth usages. Long-range Wi-Fi protocols that may be incorporated into the onboarded processing routers may consist of OpenWrt, LoRaWAN, Sigfox, or other peer-to-peer enabled or point-to-point radio wave communications. Available energy storage systems will always have capacity to provide required power to the onboarded router(s) and antennas to operate the requisite long-range Wi-Fi protocols.

Wi-Fi equipped devices such as smart phones, laptops, servers, remote sensing, or 802.11 standard network adapter-enabled digital systems may connect to the wireless local area network (WLAN) if within geographic reach. Network transmission distances will vary on router, antenna, and network protocol used. Upon connecting to the local access point(s) AP, users will be prompted to create a NFT-ID account and/or SafeMoon Wallet account to utilize the network functionality of standard Internet services, regulated by local Internet service providers, and/or Web 3.0 decentralized application services through SafeMoon blockchain operations and smart-contracts. Local APs of the WLAN configuration may be user endpoints if configured with mesh-networked protocols, downloaded through the local device.

DETAILED DRAWING DESCRIPTION

FIG. 1 shows an embodiment of the inventive energy-to-token redistribution system 10 wherein a plurality of power generators 20 transmit generated electricity to a blockchain system 30, such blockchain system comprising energy storage systems 31, processors 32 containing blockchain integrated smart contracts, transceivers 33 and a Web. 2.0 Internet connection proxy 34 and Web 2.0 gateway, whereby the electricity is transferred to the energy storage systems and thereby via power transmission line 51 to a power substation 50, as executed via off and on-chain smart contracts, for resale to the public power grid. All related transactions, such as sales of power when delivered to the power substation, are stored in a redundant ledger on the processors 32, with all such transactions and ledger entries automatically communicated via transceiver 33 to wireless endpoints 40 and/or via Web 2.0 proxy 34/Web 2.0 gateway 35. In an embodiment relying on wireless transmission, the wireless endpoint(s) will then provide internet connectivity.

Figure 2:
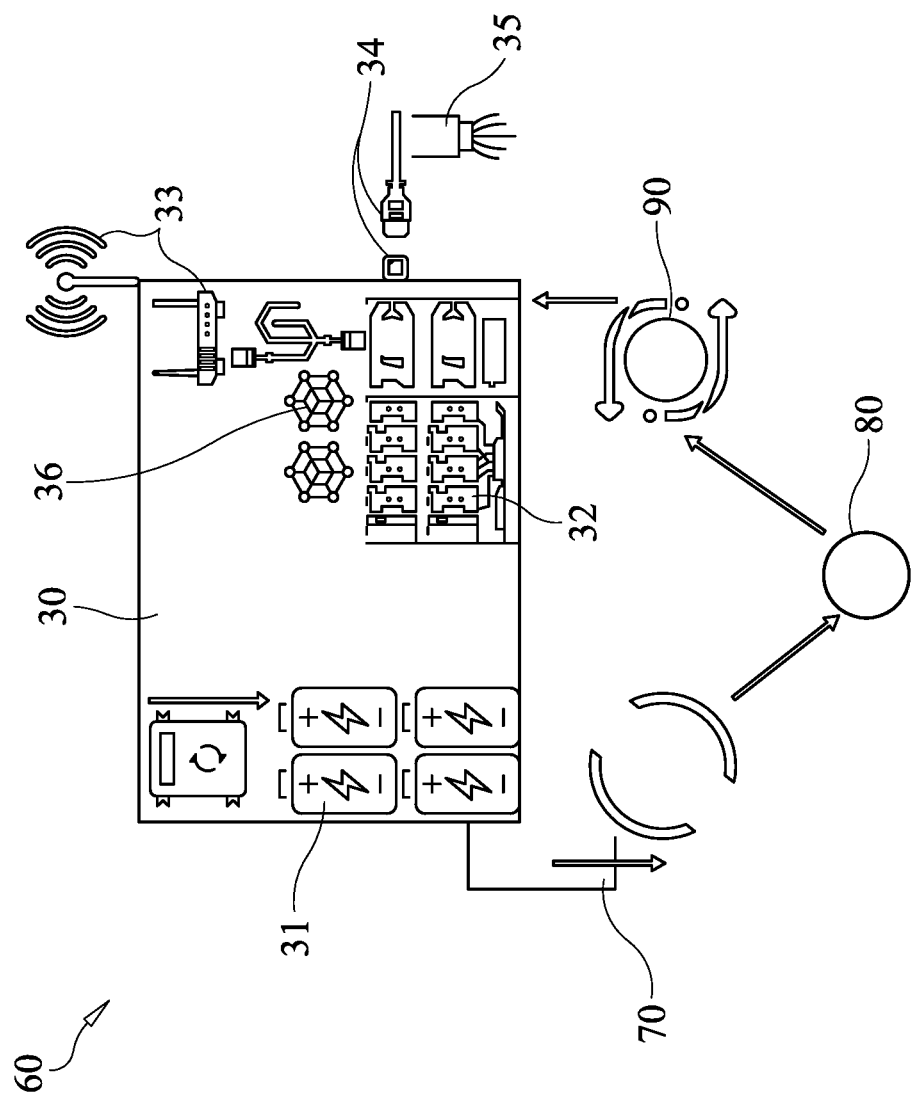
FIG. 2 is a schematic drawing evidencing a method of use for generating and selling electric power and associated RECs.

FIG. 2 shows an embodiment of a blockchain distributed network 60 comprising the blockchain system of FIG. 1, wherein the blockchain system creates one REC for each MWh of generated power transmitted from the energy storage systems 31, makes such RECs and, optionally, associated NFTs available for purchase to REC/NFT purchasers 80 and effects a transfer 70 of each such REC to such purchasers, thereby creating fiat-to-token transaction data 90, which data is stored in the redundant ledger on the processors 32.

INDEX OF PARTS

10 Energy-to-token redistribution system
20 Power generators
30 Blockchain system
31 Energy storage system
32 Processor
33 Transceiver
33A Transceiver cabling
34 Web 2.0 internet connection proxy
35 Web 2.0 gateway
36 Blockchain integrated smart contracts
40 Wireless transceiver endpoints
50 Power substation
51 Power transmission line
60 Blockchain distribution network
70 REC
80 REC/NFT purchasers
90 Fiat-to-token transaction data The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An energy-to-token redistribution system comprising: one or more power-generating devices or systems, a blockchain system comprising one or more energy storage systems embodied as lithium-ion, lithium-phosphate, vanadium redox and/or hydrogen batteries, at least one processor storing a redundant ledger, at least one blockchain integrated smart contract, one or more transceivers, and optionally, a Web 2.0 internet connection proxy and a Web 2.0 gateway, wherein all or some of the power generated by the power-generating devices is transmitted by a power transmission line to and stored in the one or more energy storage systems, such power is then transmitted by power transmission line to a power substation or other power station for power resale and the one or more transceivers are connected to one or more wireless transceiver endpoints, and wherein all power delivery and sale transaction data are stored in the redundant ledger.

2. The energy-to-token redistribution system of claim 1, wherein such system is used to effect one or more of: non-fungible token (NFT) transactions via renewable energy credits (RECs), tokens, or fiat currency; off-grid smart contract computations for user accounts connected via a provided wireless network; optional off-grid omni-token mining, minting, staking, and/or burning functions; wireless and mesh networking connectivity for off-grid and long-range Wi-Fi 802.11 standard broadcast routers and Web 3.0 decentralized application computing operations and bridge to Web 2.0 (Global Internet) connection.

3. The energy-to-token redistribution system of claim 1, wherein the at least one processor stores all transaction data, local to the system deployment in redundant ledger, such ledger embodied as one or more local chain ledgers, such transaction data to include power generation supply, renewable energy credit generation and transactions, local-NFT transactions, wireless NFT-identification (ID), and any local token transaction operations.

4. The energy-to-token redistribution system of claim 1, wherein the one or more processors house a locally cached and processing blockchain, as well as conduct mining, minting, staking, or burning operations to expand local liquidity volume, wherein, upon reaching predesignated monetary thresholds, a local liquidity value may either be transacted for stablecoin, native network and blockchain ecosystem processing coins or for custom integrated tokens via the Web 2.0 Internet connection proxy.

5. The energy-to-token redistribution system of claim 1, wherein the system is self-powered by its own power generators and energy storage systems and one or more algorithms stored on the one or more processors (1) monitor the charge of the one or more energy storage systems, (2) upon the charge reaching a preset level, or on a timed basis, prompts the energy storage system(s) to transmit power to the power substation or other power station and records the amount of such power transmission, (3) monitor preestablished financial accounts and record payments for the power sold, (4) tags recorded power generation and sale data as REC-eligible and records a related REC valuation in the redundant ledger.

6. The energy-to-token redistribution system of claim 5, wherein REC valuations from power generation and sales are bundled into transactable RECs and then converted to NFTs at a predesignated monetary valuation and recorded in the redundant ledger, such NFTs thereby becoming available for open-market purchase through the blockchain system, with the blockchain system effecting purchase agreements wherein a purchaser may buy one or more such NFTs for stablecoins, network processing coins, or custom integrated tokens of equivalent value.

7. The energy-to-token redistribution system of claim 6, wherein the purchase of RECs enabled by the blockchain system are effected through available tax-incentivized vehicles, included but not limited to power-purchase agreements (PPA) and REC-arbitrage.

8. The energy-to-token redistribution system of claim 1, wherein the one or more processors comprise graphic processing units (GPU) and/or application-specific integrated circuit (ASIC) equipment to innervate power supply operations from the energy storage systems.

9. The energy-to-token redistribution system of claim 1, wherein the one or more power generators comprise wind-turbines, solar harnessing devices and/or other known green energy power sources.

10. A method of using the energy-to-token redistribution system of claim 1, comprising the steps:
   1. generating excess energy with one or more power generators;
   2. transmitting power from the one or more power generators and storing such power in an energy storage system;
   3. self-powering the system using power from the system's own power generators and energy storage system;
   4. tagging generated energy as RECs via chain enabled smart-contracts;
   5. converting the RECs to NFTs, thus making them available for purchase on the open market, which may then be transactable through local power substations, energy storage transfer systems, centralized exchanges, decentralized exchange environments, or alternative buying power controls regulated by compliance offices;
   6. periodically transmitting stored power from the energy storage system to a power substation or other power station as a sale transaction, executed via off and on-chain smart contracts;
   7. automating the REC transaction process with the one or more processors through the Web 2.0 Internet connection proxy;
   8. depositing the capital generated from each power sale and REC transaction into off-system accounts; and
   9. consistently capturing all related transaction data including power generation amounts, power storage amounts, power sale amounts, monies collected, REC valuations and sale transaction data, in the installed redundant ledger and thereby onto both the local processing chain and Web 3.0 global network chain.

* * * * *